(12) United States Patent
Mo et al.

(10) Patent No.: US 12,555,686 B2
(45) Date of Patent: Feb. 17, 2026

(54) MODIFIED HEMOFILTRATION METHOD FOR CLEARING PERIPHERAL α-SYNUCLEIN AGGREGATES IN PATIENT WITH NEURODEGENERATIVE DISEASE

(71) Applicants: The First Affiliated Hospital of Guangzhou Medical University, Guangzhou (CN); Jiangxi Leyun Health Technology Co., Ltd, Nanchang (CN)

(72) Inventors: Mingshu Mo, Guangzhou (CN); Wenyuan Guo, Guangzhou (CN); Guoyun Chen, Nanchang (CN); Xiang Chen, Guangzhou (CN); Lin Lu, Guangzhou (CN); Hangxu Mao, Guangzhou (CN); Yangfu Luo, Guangzhou (CN); Lianqun Wang, Nanchang (CN); Xinling Yang, Urumqi (CN); Xiaokang Zhang, Guangzhou (CN); Pingyi Xu, Guangzhou (CN)

(73) Assignees: The First Affiliated Hospital of Guangzhou Medical University, Guangzhou (CN); Jiangxi Leyun Health Technology Co., Ltd, Nanchang (CN)

( * ) Notice: Subject to any disclaimer, the term of this patent is extended or adjusted under 35 U.S.C. 154(b) by 1157 days.

(21) Appl. No.: 17/504,866

(22) Filed: Oct. 19, 2021

(65) Prior Publication Data
US 2022/0415517 A1 Dec. 29, 2022

(30) Foreign Application Priority Data
Jun. 24, 2021 (CN) .......................... 202110705170.X

(51) Int. Cl.
*G16H 50/50* (2018.01)
*A61M 1/34* (2006.01)
*G16H 10/20* (2018.01)
*G16H 20/40* (2018.01)

(52) U.S. Cl.
CPC ............ *G16H 50/50* (2018.01); *A61M 1/341* (2014.02); *G16H 10/20* (2018.01); *G16H 20/40* (2018.01); *A61M 2205/3327* (2013.01); *A61M 2205/3334* (2013.01); *A61M 2230/20* (2013.01)

(58) Field of Classification Search
None
See application file for complete search history.

(56) References Cited

U.S. PATENT DOCUMENTS 9,409,146 B2 * 8/2016 Frangione ............ B01J 20/3475
2015/0355196 A1 12/2015 Anderberg et al.

FOREIGN PATENT DOCUMENTS

| CN | 102099809 A | 6/2011 |
|---|---|---|
| CN | 103983778 A | 8/2014 |
| CN | 109273050 A | 1/2019 |
| DE | 102010032081 A1 | 1/2012 |

OTHER PUBLICATIONS

Dolhun (Practical Neurology Nov./Dec. 2016:pp. 38-40).*
Giraldez-Perez et al. (Acta Neurologica Communications (2014) vol. 2:17 pages).*
China Patent Office "Office Action" issued on Jan. 25, 2024, China.

* cited by examiner

*Primary Examiner* — Lori A. Clow
(74) *Attorney, Agent, or Firm* — Cooper Legal Group, LLC

(57) ABSTRACT

A modified hemofiltration method for clearing peripheral α-synuclein aggregates in patients with neurodegenerative diseases is provided, which falls into the field of medicine. Specifically, a ratio S of synuclein dimers in blood is obtained; a blood flow velocity and an exchange membrane area for hemofiltration are determined through clinical trial data or historical literature data; hemofiltration is performed by the determined blood flow velocity and exchange membrane area, a calculation model of the ratio S of different synuclein dimers and an exchange membrane aperture D required for hemofiltration is constructed by linear regression; a clearance rate of synuclein dimers can be estimated by setting hemofiltration parameters with the calculation model. It is found that hemofiltration is beneficial to reducing the level of peripheral α-synuclein aggregates in patients with neurodegenerative diseases. Therefore, the calculation model is constructed, which provides scientific data and a new solution for clinically relieving α-synuclein-related toxicity symptoms.

2 Claims, 4 Drawing Sheets
Specification includes a Sequence Listing.

SEQUENCE LISTING

```
<160> NUMBER OF SEQ ID NOS: 1

<210> SEQ ID NO 1
<211> LENGTH: 140
<212> TYPE: PRT
<213> ORGANISM: Artificial Sequence
<220> FEATURE:
<223> OTHER INFORMATION: synthetic primer

<400> SEQUENCE: 1

Met Asp Val Phe Met Lys Gly Leu Ser Lys Ala Lys Glu Gly Val Val
1               5                   10                  15

Ala Ala Ala Glu Lys Thr Lys Gln Gly Val Ala Glu Ala Ala Gly Lys
            20                  25                  30

Thr Lys Glu Gly Val Leu Tyr Val Gly Ser Lys Thr Lys Glu Gly Val
        35                  40                  45

Val His Gly Val Ala Thr Val Ala Glu Lys Thr Lys Glu Gln Val Thr
    50                  55                  60

Asn Val Gly Gly Ala Val Val Thr Gly Val Thr Ala Val Ala Gln Lys
65                  70                  75                  80

Thr Val Glu Gly Ala Gly Ser Ile Ala Ala Ala Thr Gly Phe Val Lys
                85                  90                  95

Lys Asp Gln Leu Gly Lys Asn Glu Glu Gly Ala Pro Gln Glu Gly Ile
            100                 105                 110

Leu Glu Asp Met Pro Val Asp Pro Asp Asn Glu Ala Tyr Glu Met Pro
        115                 120                 125

Ser Glu Glu Gly Tyr Gln Asp Tyr Glu Pro Glu Ala
    130                 135                 140
```

MODIFIED HEMOFILTRATION METHOD FOR CLEARING PERIPHERAL α-SYNUCLEIN AGGREGATES IN PATIENT WITH NEURODEGENERATIVE DISEASE

TECHNICAL FIELD OF THE INVENTION

The invention relates to the field of medicine, in particular to a modified hemofiltration method for clearing peripheral α-synuclein aggregates in a patient with a neurodegenerative disease.

BACKGROUND OF THE INVENTION

α-synuclein clearance disturbance may lead to the progression of a spectrum of α-synuclein-related diseases such as Parkinson's disease (PD) and multiple system atrophy (MSA), thereby causing immune disorders and neuroinflammation. Blood purification is effective in clearing from the blood toxic substances, such as inflammatory factors, autoantibodies and toxic protein molecules. For instance, plasma or peritoneal dialysis has been reported effective in clearing Aβ toxic proteins and inflammatory factors from body. The spectrum of α-synuclein-related diseases such as PD and MSA share a similar pathogenesis to AD due to neuroimmune disorders and inflammation resulting from α-synuclein clearance disturbance with similar Aβ-like diffusion properties. Currently, no effective method is available for clearing α-synuclein aggregates to suppress immune inflammation.

Hemofiltration (HF) is a technique by which a certain amount of replacement fluid is continuously replenished in a vascular access and mixed well with blood for ultrafiltration at the same rate to clear excess water and toxins from body, without using a dialysate in the blood purification process. Compared with hemodialysis, hemofiltration features less influence on hemodynamics and high clearance rate of medium molecular substances. Due to different contributing factors, α-synuclein may exhibit a variety of forms, including stretched form, spherical form before dissolution, α-helical form, β-lamellar form, dimeric form, oligomeric form, insoluble amorphous form, fibrous form and the like. Different forms of α-synuclein are different in molecular weights, and the toxic effects of α-synuclein in dimeric and oligomeric forms are particularly significant. The above-mentioned toxic α-synuclein is just within the proper range of molecular weight for hemofiltration. A tailored hemofiltration method can help clear the peripheral toxic α-synuclein aggregates, so as to relieve the symptoms of α-synuclein-related toxicity. Currently, hemofiltration parameters are set mostly based on the molecular weight of substances for hemofiltration. Due to the dimeric structure of α-synuclein, the molecular weight distribution of α-synuclein profiles varies from patient to patient. Currently, no reference studies are available on setting hemofiltration parameters for α-synuclein dimers or polymers.

SUMMARY OF THE INVENTION

The invention aims to provide a modified hemofiltration method for clearing peripheral α-synuclein aggregates in patients with neurodegenerative diseases to address the deficiencies in the prior art. Different hemofiltration parameters can be worked out depending on different content of α-synuclein dimers by building a calculation model for clearing of peripheral α-synuclein aggregates, so that expected efficiency can be achieved for clearing of α-synuclein aggregates, which provide scientific data and a new solution for clinically relieving the symptoms of α-synuclein-related toxicity.

To achieve the above objective, the invention provides solutions as follows.

In an aspect, a modified hemofiltration method for building a model for calculating a clearance rate of peripheral α-synuclein aggregates in a patient with a neurodegenerative disease is provided, which includes the following steps:
taking a ratio S of α-synuclein dimers in blood;
determining a blood flow velocity and an exchange membrane area for hemofiltration based on massive clinical trial data or historical literature data;
performing hemofiltration based on the determined blood flow velocity and the exchange membrane area; analyzing a correlation between the ratio S of the α-synuclein dimers and an exchange membrane aperture D required for hemofiltration by linear regression, and building a calculation model for the ratio S and the exchange membrane aperture D; and
performing hemofiltration based on the ratio S of α-synuclein dimers and the exchange membrane aperture determined by the calculation model to forecast the clearance rate of peripheral α-synuclein aggregates in patients with neurodegenerative diseases.

In an embodiment, a formula for the calculation model is as follows:

$$D=5.44S+1.7376, R^2=0.7671;$$

where D refers to the exchange membrane aperture, S refers to the ratio of the α-synuclein dimers, and $R^2$ refers to a correlation coefficient.

In an embodiment, the ratio S of α-synuclein dimers in blood is determined by one of molecular bioassays including enzyme-linked immunosorbent assay, biological activity assay and enzyme-linked immunospot assay.

In another aspect, an application of the method for clearing peripheral α-synuclein aggregates in a patient with a neurodegenerative disease is provided.

In an embodiment, the method is applied to a clearance of α-synuclein aggregates in a patient with a spectrum of α-synuclein-related diseases.

In still another aspect, a modified hemofiltration method for clearing peripheral α-synuclein aggregates in a patient with a neurodegenerative disease is provided, which may include the following steps:
taking a ratio S of α-synuclein dimers in blood;
determining an exchange membrane aperture D required for hemofiltration from the calculation model; and
selecting a dialysis membrane for hemofiltration based on the determined exchange membrane aperture, and then detecting a level of α-synuclein in blood to assess the clearance of peripheral α-synuclein aggregates in patients with neurodegenerative diseases.

In a further embodiment, a method of the hemofiltration involves parameters such as exchange membrane aperture, blood flow velocity, exchange membrane area and the like, and such parameters are set based on the ratio of α-synuclein dimers carried by individuals.

In a further embodiment, the ratio of α-synuclein dimers carried by individuals is determined by molecular bioassay selected from ELISA, biological activity assay and enzyme-linked immunospot assay.

In a further embodiment, specific antibodies of the α-synuclein may include monoclonal antibodies and polyclonal antibodies, in the form of complete antibody molecules, any fragment or modified fragment of the antibodies, as long as the fragment can be bound to the α-synuclein. Preparation of the antibodies for use at protein level is well known to those skilled in the art, and the antibodies can be prepared with any method according to the invention.

In the context of the invention, α-synuclein gene expression products may include human α-synuclein and some peptides of human α-synuclein, and the peptides of human α-synuclein contains functional domains associated with α-synuclein-related diseases.

"α-synuclein" includes human α-synuclein and any functional equivalents of human α-synuclein. Such functional equivalents involve conservative variant proteins of human α-synuclein, or active fragments thereof, or active derivatives thereof, allelic variants, natural mutants, induced mutants, or DNA-encoded proteins that can hybridize with DNA of human α-synuclein under high or low strict conditions.

α-synuclein is a protein with the following amino acid sequence:
(1) a protein consisting of an amino acid sequence shown in SEQ ID NO.1; MDVFMKGLSK AKEGVVAAAE KTKQGVAEAA GKTKEGVLYV GSKTKEGVVH GVATVAEKTK EQVTNVGGAV VTGVTAVAQK TVEGAGSIAA ATGFVKKDQL GKNEEGAPQE GILEDMPVDP DNEAYEMPSE EGYQDYEPEA
(2) a protein derived from the amino acid sequence shown in SEQ ID NO.1, with the same function as the amino acid sequence shown in SEQ ID NO.1 after substitution and/or deletion and/or addition of one or more amino acid residues; the number of substituted, deleted or added amino acids is usually 1-50, preferably 1-30, more preferably 1-20, and most preferably 1-10;
(3) a polypeptide with an amino acid sequence having at least 80% homology (also known as sequence identity) with the amino acid sequence shown in SEQ ID NO.1, more preferably, about 90% to 95% homology, and usually 96%, 97%, 98% and 99% homology.

In an illustrated embodiment of the invention, the α-synuclein is a protein having an amino acid sequence shown in SEQ ID NO.1

In general, it is known that modification of one or more amino acids in a protein will not affect the functions of the protein. Anyone skilled in the art would recognize that changes in a single amino acid or a small percentage of amino acids or addition, deletion, insertion or substitution of individual amino acid sequences are conservative modifications, where changes in the protein produce a protein with similar functions. It is well known in the art that a conservative substitution list of amino acids with similar functions will be provided.

A protein modified by adding one amino acid or a plurality of amino acid residues is, for example, a fusion protein of the α-synuclein. There is no restriction on the peptides or proteins fused with the α-synuclein as long as the fusion protein retains bioactivities of the α-synuclein.

The α-synuclein of the invention also includes non-conservative modification to the amino acid sequence shown in SEQ ID NO.1 as long as the modified proteins retain bioactivities of the α-synuclein. The number of mutant amino acids in such modified proteins is typically 10 or less, e.g., 6 or less, e.g., 3 or less.

In the context of the invention, the "α-synuclein-related toxicity symptoms" include both determining whether a subject has suffered from α-synuclein-related toxicity symptoms, and whether the subject is at risk of suffering from the symptoms.

In the context of the invention, "relieving symptoms of α-synuclein-related toxicity" includes relief of symptoms and complete cure of diseases based on changes in status of the symptoms.

α-synuclein is considered as a pathogenic substance of PD with high self-polymerization capacity, and it can form oligomers and fibers with higher toxicity than α-synuclein monomers. Therefore, whether a method can relieve the toxicity of α-synuclein can be determined by detecting whether it can restrain and clear peripheral α-synuclein aggregates in patients with neurodegenerative diseases and block the toxicity of the α-synuclein.

In an illustrated embodiment of the invention, total proteins are extracted from peripheral blood to study detection of the α-synuclein level. It is known to those skilled in the art that cell-expressed α-synuclein (i.e., soluble α-synuclein) in a brain tissue will shed into peripheral blood for circulation, therefore, the level of α-synuclein in blood can indirectly reflect the expression of α-synuclein genes in the brain tissue. According to the findings of the invention, both the level and composition of α-synuclein can be detected by extracting a body fluid, especially peripheral blood, to determine whether a subject is suffering from symptoms of α-synuclein-related toxicity.

The invention discloses the following technical effects:

The invention found for the first time that hemofiltration contributes to the reduction of peripheral α-synuclein aggregates in patients with neurodegenerative diseases. Therefore, it studies on the correlation between α-synuclein and exchange membrane aperture based on the clinical experience in determining blood flow velocity and exchange membrane area, and built a calculation model for α-synuclein and exchange membrane aperture. As a result, a clearance rate of 20±2% for peripheral α-synuclein aggregates in patients with neurodegenerative diseases is achieved. It is clear that the invention develops a modified hemofiltration method for clearing peripheral α-synuclein aggregates in patients with neurodegenerative diseases, which is of great significance for relieving symptoms of α-synuclein-related toxicity or reducing the risk of suffering from α-synuclein-related diseases. Therefore, the invention bridges the gap of previous methods for clearing toxic α-synuclein. The technique tailors the hemofiltration method to individual conditions for clearing peripheral α-synuclein aggregates in patients with neurodegenerative diseases in a timely, specific and effective manner, and plays a role in relieving symptoms of α-synuclein-related toxicity, which provides a scientific basis and a new solution for clinical application.

BRIEF DESCRIPTION OF THE DRAWINGS

In order to clarify the technical solutions in the embodiments of the invention or the prior art, the drawings used in the embodiments will be introduced below. Obviously, the drawings in the following description serve as some embodiments of the invention. For those skilled in the art, other drawings can be obtained based on these drawings without creative work.

DETAILED DESCRIPTION OF THE EMBODIMENTS

Figure 1A:
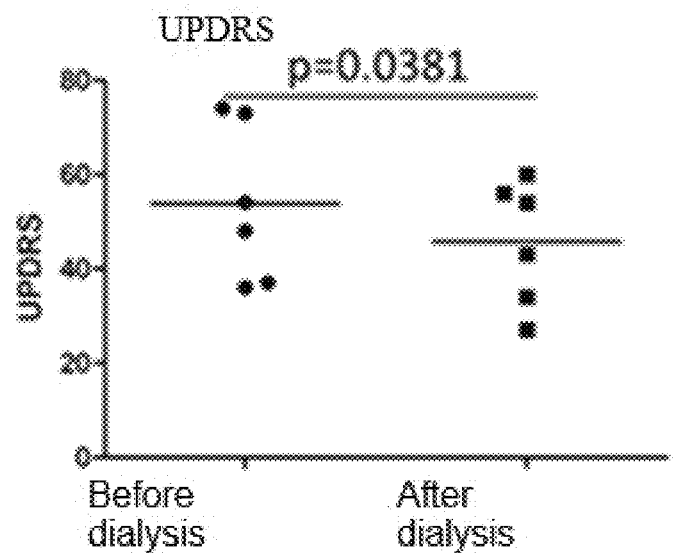
FIGS. 1a-1b show UPDRS and HY rating scores for a patient with Parkinson's disease before and after dialysis.
Figure 1B:
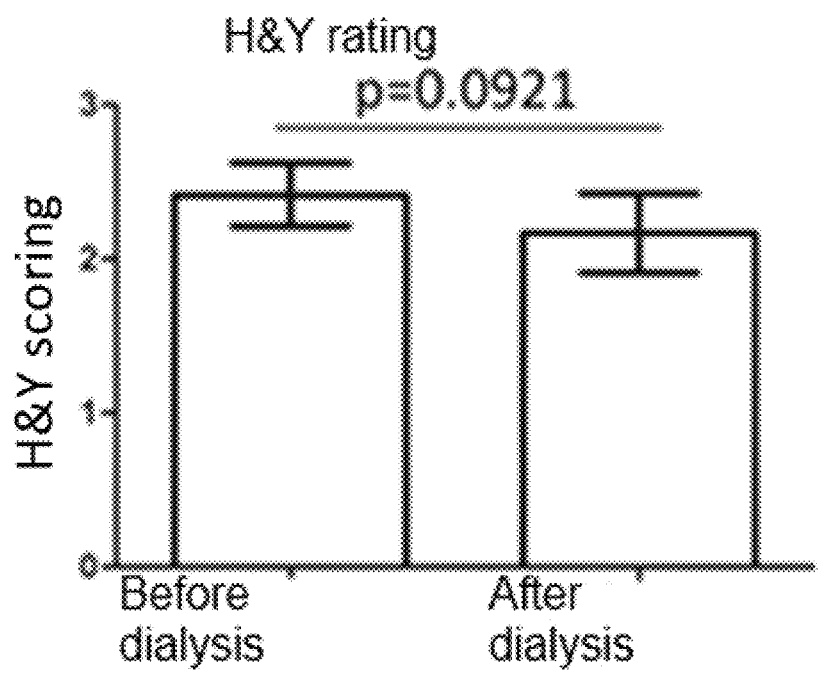
Figure 2A:
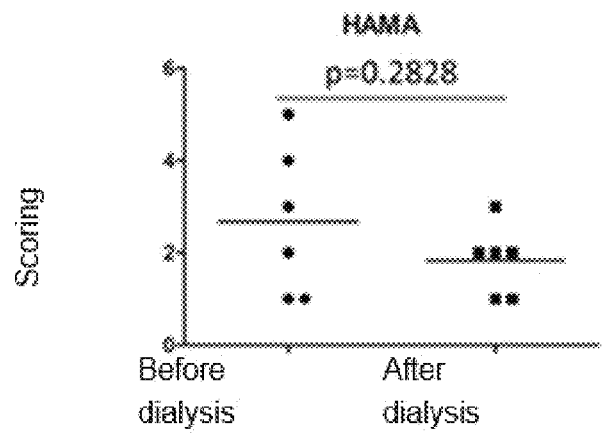
FIGS. 2a-2f show HAMA, HAMD, MMSE, MoCA, non-motor scale and ADL scores for a patient with Parkinson's disease before and after dialysis.
Figure 2B:
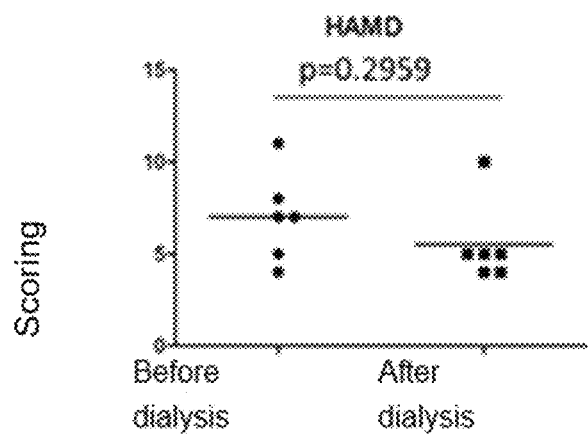
Figure 2C:
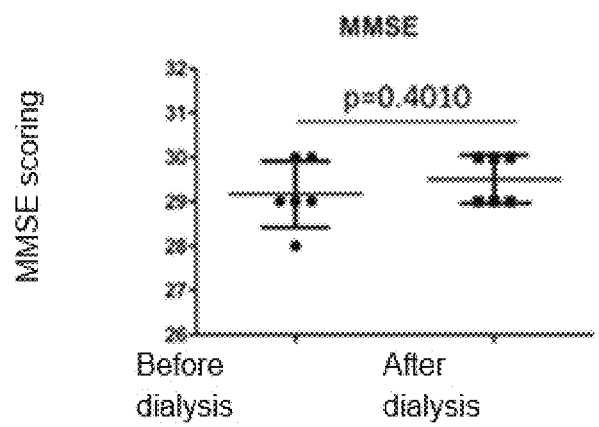
Figure 2D:
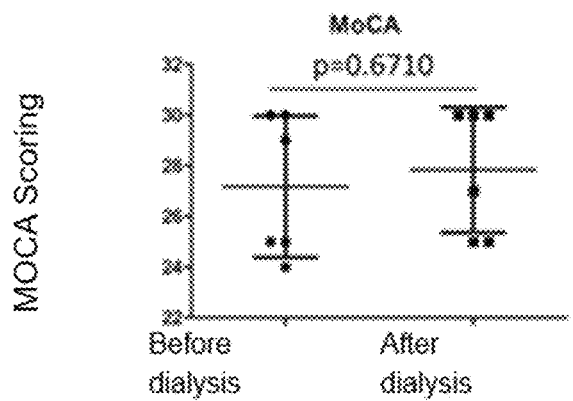
Figure 2E:
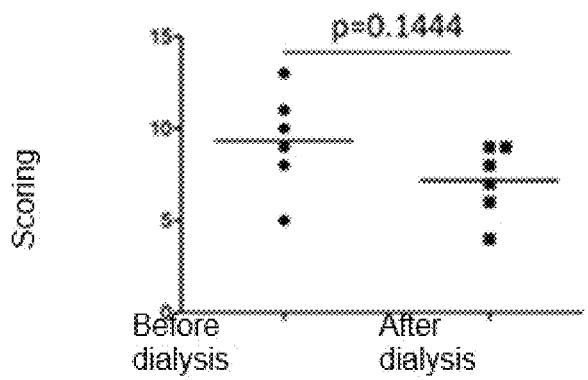
Figure 2F:
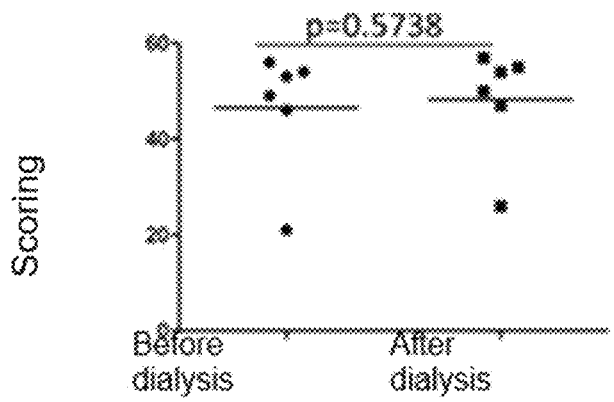

The invention will now give a detailed account of its exemplary embodiments, which should not be construed as a limitation, but rather a more detailed description of certain aspects, features and embodiments thereof.

It should be understood that the terms mentioned herein are only intended to describe specific embodiments, instead of setting any restriction on the invention. Furthermore, the range of values in the invention should be understood as an intermediate value between the upper and lower limits of the range specifically disclosed. Each smaller range between any stated value or intermediate value within a stated range and any other such value is also covered in the invention. The upper and lower limits of these smaller ranges can be included in or excluded from the scope separately.

Unless otherwise specified, all technical and scientific terms used herein have the same meaning as commonly understood by those skilled in the art in the field of the invention. Although the invention describes only preferred methods and materials, any methods and materials similar or equivalent to those described herein can also be used in the practice or testing of the invention. All documents mentioned in the specification are incorporated herein by reference for the purpose of disclosing and describing the methods and/or materials associated with the documents. In the event of any conflict with any incorporated document, the contents of the specification shall prevail.

It is readily apparent to those skilled in the art that various modifications and changes can be made to the specific embodiments of the specification without departing from the scope or spirit of the invention. Upon reading this disclosure, many alternative embodiments of the invention will be apparent to those skilled in the art. The specification and examples of this application are exemplary.

As used herein, the terms "including", "comprising", "having" and "containing" are all open terms, which means including but not limited to.

Embodiment 1

1. It is validated by in vitro experiments that hemofiltration could reduce the level of peripheral α-synuclein aggregates in patients with neurodegenerative diseases.

An in vitro hemofiltration model is built by using an HF-80S high-flux dialyzer produced by Fresenuis Medical Care Co., Ltd., and different filtration rates, filtration areas and exchange membrane apertures are set according to the experimental requirements. 3 L of fresh bovine whole blood with the hematocrit adjusted to (31±0.5)% is stored in a water bath at a constant temperature of (36.7±0.5)° C., and different combinations of α-synuclein dimers are added according to the experimental requirements to simulate the circulating blood of patient. The simulated blood is allowed to pass through the in vitro hemofiltration model, and the levels of α-synuclein before and after filtration are collected and tested to calculate a clearance efficiency.

2. The following relations among dialysis speed, dialysis membrane area and clearance efficiency of α-synuclein dimers in the presence of α-synuclein dimers in different ratios were determined by the above test, as shown in Table 1.

TABLE 1

| Ratio of α-synuclein dimers (cerebrospinal fluid) | Dialysis speed (milliliter per minute (ml/min)) | Dialysis membrane area (square meter ($M^2$)) | Ratio of clearance efficiency of α-synuclein aggregates (cerebrospinal fluid) |
|---|---|---|---|
| 0.001 | 150 | 1.30 | 0.23 |
| 0.005 | 180 | 1.33 | 0.24 |
| 0.01 | 210 | 1.36 | 0.24 |
| 0.05 | 240 | 1.39 | 0.25 |
| 0.1 | 270 | 1.42 | 0.24 |
| 0.2 | 300 | 1.48 | 0.24 |
| 0.4 | 330 | 1.51 | 0.23 |

As shown in Table 1, when different dialysis speeds and dialysis membrane areas were set for α-synuclein dimers in different ratios, the clearance efficiency is about 20% with little difference. In other words, dialysis speed and dialysis membrane area are not the key factors affecting the clearance efficiency of α-synuclein dimers.

Figure 3:
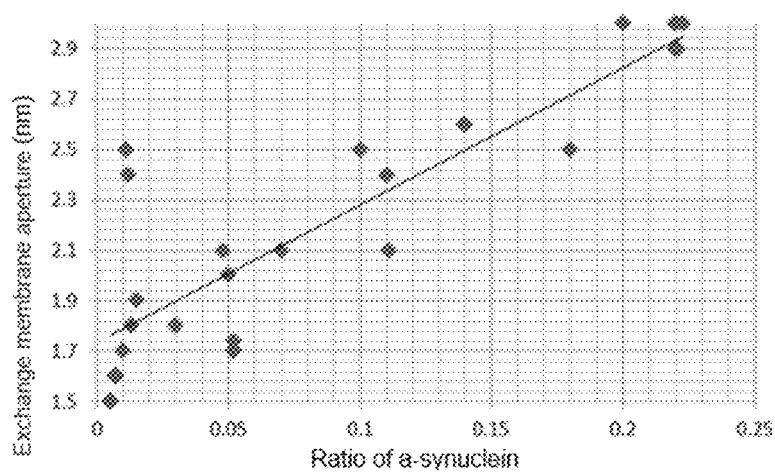
FIG. 3 shows distribution of exchange membrane aperture and ratio of α-synuclein.

Therefore, in order to keep the clearance efficiency of α-synuclein aggregates at 20±2%, the distribution of apertures of corresponding exchange membranes is investigated at different ratios of α-synuclein dimers when the dialysate flow rate is set at 200 ml/min and the filtration area is set at 1.35 m², as shown in FIG. 3.

It can be easily derived from FIG. 3 that the formula for a calculation model for the correlation between the ratio of α-synuclein and the exchange membrane aperture is as follows: $D=5.44S+1.7376$, $R^2=0.7671$; where D is the exchange membrane aperture, S is the ratio of α-synuclein dimers, and $R^2$ is a correlation coefficient.

Embodiment 2

Method for Clinical Determination of α-Synuclein

1. Collection of Peripheral Blood and Samples

A total of 50 patients with Parkinson's disease (PD), aged 57-66 years old, from the First Affiliated Hospital of Guangzhou Medical University were diagnosed with PD based on United Kingdom (UK) Brain Bank Clinical Diagnostic Criteria for Parkinson's Disease. A total of 40 cases in a control group were selected from the group subjected to routine physical examination in the First Affiliated Hospital of Guangzhou Medical University. All the subjects, aged 55-68 years old, were excluded from diseases such as blood lipid metabolism and chronic degenerative diseases of the nervous system. All the subjects have signed the informed consent forms for the test item for UPDRS scoring, and peripheral blood was provided for the assay of α-synuclein.

2. Preparation of an Assay Kit for Determination of α-Synuclein (1) In order to quantitatively determine the content of α-synuclein, two different monoclonal anti-α-synuclein antibodies against human α-synuclein were used, including an anti-α-synuclein monoclonal antibody as a capture antibody and a biotinylated mouse anti-human α-synuclein monoclonal antibody as an assay antibody.

(2) An antibody captured on a 96-well assay plate was embedded in a phosphate buffer saline solution (PBS) at room temperature overnight at a final concentration of 4.0 micrograms per milliliter (μg/ml).

(3) After washing with a Wash Buffer (a PBS containing 0.05% Tween20, PH=7.2) for 3 times, the assay plate was sealed with Reagent Diluents (1% bovine serum albumin (BSA) in PBS) at 25° C. for 1 hour (h).

3. Determination of Serum and Soluble α-Synuclein
  (1) 250 microliters (μl) (or 0.25 gram (g)) of whole blood were added to an RNase-Free filter column, and centrifuged at 13,000 revolutions per minute (rpm) for 2 minutes (min), and then supernatant was collected;
  (2) soluble human TRME2-FC and human α-synuclein-FC were used as standards in all tests;
  (3) 100 μl of fresh rewarmed serum and standards were added to a coated plate to be tested, and incubated at room temperature for 2 h; then added to 100 μl of soluble α-synuclein assay antibody (final concentration: 35.0 nanograms per milliliter (μg/ml)) and α-synuclein assay antibody (final concentration: 25.0 ng/ml) and incubated at room temperature for 2 h after washing with a Wash Buffer;
  (4) after washing with the Wash Buffer, 100 μl of horseradish peroxidase-labeled streptavidin was added and incubated away from light at room temperature for 20 min;
  (5) after washing with the Wash Buffer, 100 μl of developing reagent (R&D Catalog #DY999) was added and incubated away from light at room temperature for 20 min;
  (6) the color development was suspended by adding 50 μl of 2N sulfuric acid (R&D Catalog #DY994); and
  (7) an optical density (OD) value of each well was measured at 450 nanometers (nm), and the OD value measured at 540 nm was used for calibration.

4. Statistical Method

All tests were performed with three replicates, and the resulting data described as mean±standard deviation were subjected to statistical analysis by using Statistical Product and Service Solutions 21.0 (SPSS21.0) statistical software. The difference therebetween was tested by t-test, and considered to be statistically significant when $P<0.05$.

Embodiment 3

A modified hemofiltration method for building a model for calculating a clearance rate of peripheral α-synuclein aggregates in patients with neurodegenerative diseases is applied as follows:

1. Specific Case

A female 81-year-old patient, married, was admitted to the hospital with tremor for 13 years. The female patient presented tremor in her left upper limb 13 years ago, and the symptom tended to appear at rest, and disappear with exercise and stress without obvious worsening or relieving factors. The female patient was then treated in the First Affiliated Hospital of Sun Yat-Sen University and given 0.125 g of Madopar bis in die (BID, i.e., twice a day) and 10 mg of coenzyme Q10 quaque die (QD, once a day), and the tremor did not get worse. Three years ago, the patient's symptoms worsened and she had difficulty in getting asleep at night and needed to take "2 mg of clonazepam" orally to fall asleep. Two years ago, the patient also had static tremor in her right upper limb with a frequency the same as that in the female patient's left upper limb and an amplitude a bit smaller than that in the female patient's left upper limb. Moreover, she also had constipation, generally defecated once every 3-4 days, and sometimes even needed paraffin oil or Glycerine Enema, and therefore, she orally took 0.25 g of Madopar ter in die (TID, i.e., three times a day), 0.25 mg of Sifrol TID and 0.2 g of entacapone tablets TID. One year ago, the patient walked unsteadily, i.e., difficulty in making the first step, smaller and smaller strides during walking, and easy to fall when turning. In addition, she had lower jaw tremor which was obvious at rest, difficulty in moving neck and poor appetite, felt difficult in buttoning and putting on slippers and was depressed. The symptoms were not relieved significantly after she took one Flupentixol and Melitracen Capsule QD. One week ago, the patient felt more tired with dyspnea at 3 p.m., the symptom was not relieved after oxygen inhalation and disappeared at 8-9 p.m. The patient had good mental state, poor sleep and defecation (the same as above), and normal urination since the onset of the disease. Physical examination on admission showed: body temperature: 36.5° C., pulse: 78 beats/min, respiratory rate: 20 breaths/min, and blood pressure: 117/60 mmHg There was no special condition in heart, chest and abdomen. The patient had clear mind, vague speech, pertinent response, cooperation in physical examination, rigid face, festinating gait, short-term hypomnesia, roughly normal orientation and visual-spatial ability, decrease in executive ability, hyposmia, no defect in rough view, flexible eye movement, bilateral pupils which were equal in size and roundness (d=3 mm) and sensitive to light reflex and convergence reflex, rough binaural hearing loss with sound in the middle according to a weber's test (AC>BC), and lower jaw tremor. Physical examination of the remaining cranial nerves showed no abnormalities. The cervical muscle tone was at grade 3, increasing like a cogwheel, the chin-sternum straight distance was about two fingers in width, and the left alternating movements were not flexible. The left hand swing was smaller than the right hand swing during walking. According to a posterior drawer test (+), the muscle tone in both upper limbs increased like a cogwheel, where the muscular strength was at grade 5, and tendon reflex was +++; the muscle tone in both lower limbs was normal, where the muscular strength was at grade 5-, and tendon reflex was +. According to a straight leg raising test on the left lower limb (+), there is no obvious abnormality in superficial sensation, deep sensation and cortical combined sensation. No pathological sign was induced, and there was a negative meningeal irritation sign. Diagnosis on admission: Parkinson's disease; pathological sinus syndrome, for which a cardiac pacemaker was implanted; and coronary atherosclerotic heart disease.

The female patient received relevant examinations and signed the informed consent form: as the female patient was in the middle and advanced stage of Parkinson's disease, the female patient had no obvious improvement after treatment. Recently, the symptoms worsened with unsteadiness in walking, lower jaw tremor as well as dyspnea and chest tightness in the afternoon to evening. Parkinson's disease is considered as one of a spectrum of α-synuclein-related diseases with immune disorders and neuroinflammation. Blood purification is effective in clearing toxic substances from the plasma, such as inflammatory factors, autoantibodies and toxic protein molecules. For example, plasma or peritoneal dialysis has been reported effective in clearing Aβ toxic proteins and inflammatory factors. Parkinson's disease and Alzheimer's disease have similar pathogenesis due to neuroimmune disorders and inflammation resulting from α-synuclein clearance disturbance with similar Aβ-like diffusion properties. Currently, no effective method is available for clearing immune inflammation in clinical treatment of Parkinson's disease. Blood purification could be helpful in clearance of immune inflammatory molecules from peripheral nerves and play an important role in clinical prevention and treatment of Parkinson's disease. Although the patient was old, she was able to tolerate clinical trials on blood purification for toxic proteins and immune inflammatory factors in peripheral blood of patients with a spectrum of α-synuclein-related diseases. The female patient and the female patient's family (daughter-in-law) were informed of the risks in blood purification and that the treatment outcome may not meet their expectations. After careful consideration, the patient and her family expressed their informed understanding and signed the informed consent form. Blood purification was to be performed in the following week.

2. Implementation Solution

The ratio of α-synuclein in the blood of the subject was acquired by the method in the Embodiment 2, and the result showed that the ratio of α-synuclein dimers in the cerebrospinal fluid of the subject was about 0.035. According to the formula for the calculation model of the invention, the exchange membrane aperture was 1.928 nm. A treatment plan was then developed.

Blood purification was performed: parameters for hemoperfusion were determined as follows: the exchange membrane aperture was 2 nm, the blood flow velocity was 200 ml/min, and the exchange membrane area was 1.35 m$^2$; and hemoperfusion was performed once every 2 h, 3 times in total.

Changes in symptoms before and after treatment: the female patient's tremor and slow movement turned better at admission. Physical examination: the patient had clear mind, vague speech, pertinent response, cooperation in physical examination, rigid face, festinating gait, short-term hypomnesia, roughly normal orientation and visual-spatial ability, decrease in executive ability, hyposmia, no defect in rough view, flexible eye movement, bilateral pupils which were equal in size and roundness (d=3 mm) and sensitive to light reflex and convergence reflex, rough binaural hearing loss with sound in the middle according to a weber's test (AC>BC), and lower jaw tremor. Physical examination of the remaining cranial nerves showed no abnormalities. The cervical muscle tone was at grade 2, increasing like a cogwheel, the chin-sternum straight distance was about the width of two fingers, and the left alternating movements were not flexible. The left hand swing was smaller than the right hand swing during walking. According to a posterior drawer test (−), the muscle tone in both upper limbs increased like a cogwheel, where the muscular strength was at grade 5, and tendon reflex was +++; the muscle tone in both lower limbs was normal, where the muscular strength was at grade 5−, and tendon reflex was +. According to a straight leg raising test on the left lower limb (+), there is no obvious abnormality in superficial sensation, deep sensation and cortical combined sensation. No pathological sign was induced, and there was a negative meningeal irritation sign.

The concentration of α-synuclein in cerebrospinal fluid was tested again after the treatment, and the clearance efficiency was about 0.232. Meanwhile, it was found through comparison among multiple scores for the symptoms of patients with Parkinson's disease before and after dialysis that such symptoms were significantly relieved after dialysis, as shown in FIGS. 1a-1b and FIGS. 2a-2f.

The preferred embodiments described herein are for illustration purpose only, and are not intended to restrict the invention. Various modifications and changes on the technical solution of the invention made by those skilled in the art without departing from the design spirit of the invention shall fall within the protection scope set forth in claims of the invention.

What is claimed is:

1. A modified hemofiltration method for clearing peripheral α-synuclein aggregates in a patient with a neurodegenerative disease, comprising the following steps:

detecting a concentration of α-synuclein in a blood sample of the patient by an enzyme-linked immunosorbent assay using two different monoclonal anti-α-synuclein antibodies, the two different monoclonal anti-α-synuclein antibodies comprising an anti-α-synuclein monoclonal antibody as a capture antibody and a biotinylated mouse anti-human α-synuclein monoclonal antibody as an assay antibody, and calculating a ratio (S) representing a proportion of α-synuclein dimers relative to total α-synuclein;

performing the hemofiltration to determine a blood flow velocity, exchange membrane aperture (D) and an exchange membrane area for the hemofiltration of the patient with the neurodegenerative disease;

analyzing a correlation between the ratio (S) of the α-synuclein dimers and the exchange membrane aperture (D), wherein the exchange membrane aperture (D) represents a membrane pore diameter required to achieve the hemofiltration according to the ratio (S) of the patient, and building a calculation model for the ratio (S) and the exchange membrane aperture (D); and performing the hemofiltration on the patient with the neurodegenerative disease based on the ratio (S) of the α-synuclein dimers and the exchange membrane aperture (D) determined by the calculation model to find a clearance rate of the peripheral α-synuclein aggregates, wherein the hemofiltration comprises three sessions of two hours each, and evaluating treatment efficacy by measuring post-treatment cerebrospinal fluid α-synuclein concentration and a clinical motor-function score of the neurodegenerative disease.

2. The modified hemofiltration method according to claim 1, wherein a formula for the calculation model is as follows:

$$D=5.44S+1.7376, R^2=0.7671;$$

where D is the exchange membrane aperture, S is the ratio of the α-synuclein dimers relative to the total α-synuclein, and $R^2$ is a correlation coefficient.

* * * * *